(12) United States Patent
Kim et al.

(10) Patent No.: US 10,895,278 B2
(45) Date of Patent: Jan. 19, 2021

(54) APPARATUS FOR LIMITING ROTATION OF STEERING WHEEL

(71) Applicant: MANDO CORPORATION, Gyeonggi-do (KR)

(72) Inventors: Hosik Kim, Seoul (KR); Jungsik Park, Gyeonggi-do (KR); Jeongrae Kim, Seoul (KR); Seulki Yeom, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 160 days.

(21) Appl. No.: 15/902,986

(22) Filed: Feb. 22, 2018

(65) Prior Publication Data

US 2018/0238377 A1 Aug. 23, 2018

(30) Foreign Application Priority Data

Feb. 23, 2017 (KR) .................. 10-2017-0024184

(51) Int. Cl.
 *B62D 5/00* (2006.01)
 *B62D 5/04* (2006.01)
 (Continued)

(52) U.S. Cl.
 CPC ............ *F16B 39/124* (2013.01); *B62D 5/001* (2013.01); *B62D 5/005* (2013.01); *B62D 6/10* (2013.01);
 (Continued)

(58) Field of Classification Search
 CPC ...... B62D 5/001; B62D 5/005; B62D 5/0475; B62D 6/10; F16B 33/002; F16B 39/02;
 (Continued)

(56) References Cited

U.S. PATENT DOCUMENTS 2,356,861 A * 8/1944 Link ................. B63H 25/28
 74/89.37
2,417,434 A * 3/1947 Mead ................ F16H 25/2015
 192/143

(Continued)

FOREIGN PATENT DOCUMENTS

CN 1485235 3/2004
CN 1689886 11/2005
 (Continued)

OTHER PUBLICATIONS

Office Action dated Mar. 19, 2020 for Chinese Patent Application No. 201810155351.8 and its English machine translation by Google Translate.

(Continued)

*Primary Examiner* — Ruth Ilan
*Assistant Examiner* — Maurice L Williams
(74) *Attorney, Agent, or Firm* — Ladas & Parry, LLP

(57) ABSTRACT

Provided is an apparatus for limiting rotation of a steering wheel, and more particularly, an apparatus for limiting rotation of a steering wheel, whereby a rotation angle of the steering wheel can be limited to a predetermined angle. The apparatus for limiting rotation of the steering wheel, installed in a steering system, includes: an end-stopper disposed inside a housing through which a steering shaft on which the steering wheel is installed, passes, and the end-stopper limiting a rotation angle of the steering wheel to a predetermined angle.

19 Claims, 4 Drawing Sheets

(51) Int. Cl.
  *F16B 33/00* (2006.01)
  *F16B 39/12* (2006.01)
  *B62D 6/10* (2006.01)

(52) U.S. Cl.
  CPC .......... *B62D 5/0475* (2013.01); *F16B 33/002* (2013.01); *F16M 2200/024* (2013.01); *Y10T 74/18688* (2015.01)

(58) Field of Classification Search
  CPC ...... F16B 39/12; F16B 39/122; F16B 39/124; F16B 39/126; F16B 39/128; F16M 2200/021; F16M 2200/024; Y10T 74/18688
  See application file for complete search history.

(56) References Cited

U.S. PATENT DOCUMENTS

| | | | | |
|---|---|---|---|---|
| 2,944,437 | A * | 7/1960 | Pickles | F16H 25/2015 74/89.37 |
| 3,202,008 | A * | 8/1965 | Geyer | F16H 25/2015 74/89.37 |
| 4,814,743 | A * | 3/1989 | Hanaki | B60Q 1/40 200/61.35 |
| 5,662,003 | A * | 9/1997 | Ohara | G05G 1/08 74/498 |
| 2007/0068207 | A1* | 3/2007 | Goshima | B60R 25/0211 70/186 |
| 2008/0098777 | A1* | 5/2008 | Tanioka | B60R 25/02153 70/184 |
| 2009/0114470 | A1* | 5/2009 | Shimizu | B62D 1/16 180/444 |
| 2013/0161117 | A1 | 6/2013 | Higashi et al. | |
| 2013/0253771 | A1* | 9/2013 | Hayama | B62D 5/001 701/43 |
| 2015/0307063 | A1* | 10/2015 | Behrens | B60R 25/02153 70/252 |
| 2016/0347361 | A1* | 12/2016 | Schnug | B62D 3/12 |
| 2016/0355207 | A1* | 12/2016 | Urushibata | B62D 1/16 |
| 2018/0105198 | A1* | 4/2018 | Bodtker | B62D 5/005 |

FOREIGN PATENT DOCUMENTS

| | | | |
|---|---|---|---|
| CN | 103171618 | 6/2013 | |
| CN | 104417599 | 3/2015 | |
| DE | 10 2007 03973 | 2/2009 | |
| EP | 2641814 B1 * | 12/2014 | |
| FR | 2809522 A1 * | 11/2001 | ............... G09B 9/04 |
| JP | 2016-8011 | 1/2016 | |
| KR | 10-2008-0004177 | 1/2008 | |
| KR | 10-2015-0046575 | 4/2015 | |
| WO | 03/091081 | 11/2003 | |

OTHER PUBLICATIONS

Office Action dated Apr. 21, 2020 for German Patent Application No. 10 2018 103 963.8 and its English machine translation by Google Translate.

* cited by examiner

APPARATUS FOR LIMITING ROTATION OF STEERING WHEEL

CROSS-REFERENCE TO RELATED APPLICATION

This application claims priority to and the benefit of Korean Patent Application No. 10-2017-0024184, filed on Feb. 23, 2017, the disclosure of which is incorporated herein by reference in its entirety.

BACKGROUND

1. Field of the Invention

The present invention relates to an apparatus for limiting rotation of a steering wheel, and more particularly, to an apparatus for limiting rotation of a steering wheel, whereby a rotation angle of the steering wheel can be limited to a predetermined angle.

2. Discussion of Related Art

A power steering system for a vehicle has a general construction of a hydraulic operation circuit, which forms a predetermined oil pressure by using an oil pump driven by a belt or the like with power of an engine and constitutes a hydraulic circuit in which the oil pressure acts as a driving power, configured to steer wheels using an increased force applied to a driver's steering force.

In other words, such a power steering system by hydraulic operation requires an operating member such as an oil pipe and a rotary valve for constituting an oil pump and a plurality of oil circuits, so that it has a considerably complicated configuration and requires a large number of parts, and there is a burden on weight reduction and cost reduction.

A steer-by-wire system (hereinafter referred to as an "SBW system") for automobiles for solving such disadvantages includes a steering reaction force device and a front wheel steering device. In a normal time, in a state in which a steering wheel and a front wheel are mechanically disconnected, an electronic control unit receives a steering angle as an electric signal and drives the front wheel steering device to steer the front wheel.

In addition to the effect of solving the disadvantages of the power steering system described above, the SBW system can easily implement the function of varying a steering ratio according to a driving situation such as a vehicle speed so that a driver's convenience and car stability can be improved.

However, the SBW system requires an end-stopper for restricting a rotation angle of the steering wheel to a predetermined angle.

In the related art, rotation of the steering wheel is restrained by an end-stopper using a motor. However, this may cause a cost increase and a disadvantage in terms of package.

DOCUMENT OF RELATED ART

Patent Document

Korean Laid-open Patent Application No. 10-2008-0004177 (published on Jan. 9, 2008)

SUMMARY OF THE INVENTION

The present invention is directed to an apparatus for limiting rotation of a steering wheel, whereby a rotation angle of the steering wheel can be limited to a predetermined angle.

According to an aspect of the present invention, there is provided an apparatus for limiting rotation of a steering wheel, which is installed in a steering system, the apparatus including: an end-stopper disposed inside a housing through which a steering shaft on which the steering wheel is installed, passes, and the end-stopper limiting a rotation angle of the steering wheel to a predetermined angle.

The end-stopper may include: a lead screw coupled to an end of the steering shaft; a pair of stoppers installed on both ends of the lead screw; and a nut passing through the lead screw and disposed between the pair of stoppers.

The apparatus may further include a stopping guide configured to restrain rotation of the nut.

The nut may include: a chamfered portion being in surface contact with the stopping guide; a mounting portion recessed in the chamfered portion; and an elastic member inserted into the mounting portion.

The elastic member may protrude from the chamfered portion at a predetermined interval.

The stopper may include a stopper stopping jaw projecting toward the nut.

The nut may include a nut stopping jaw protruding toward the stopper on both sides thereof.

When the stopper stopping jaw and the nut stopping jaw are in contact with each other, rotation of the steering wheel may be limited.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
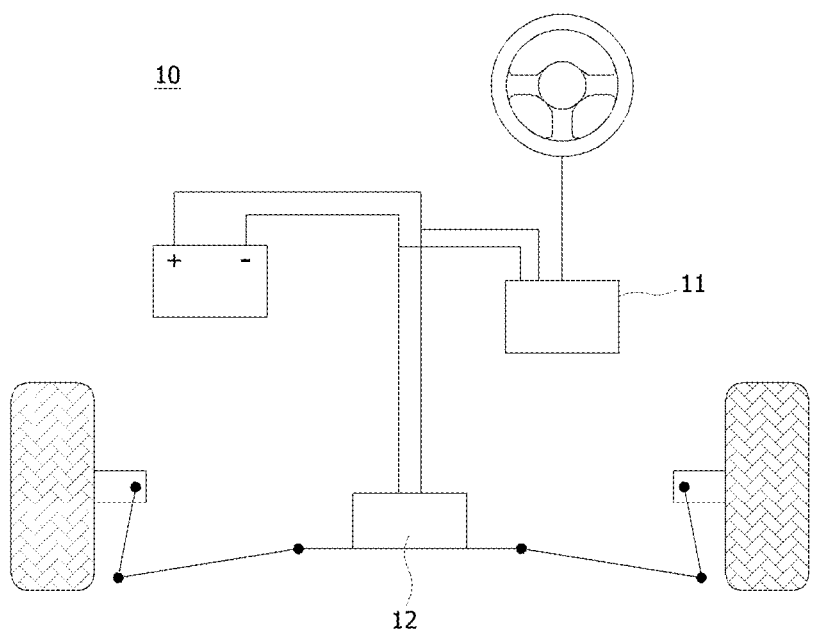
FIG. 1 is a schematic view of a steer-by-wire (SBW) system.

A most preferable embodiment of the present invention will be described in detail below with reference to the accompanying drawings in order to describe in detail so that those skilled in the art can easily embody the technical spirit of the present invention.

It should be firstly noted that, when adding reference numerals to elements of each drawing, the same reference numerals are used for the same elements even though the same elements are illustrated in different drawings.

Also, in the description of the present invention, if it is determined that a detailed description of commonly-used configurations or functions related to the invention may obscure the subject matter of the invention, the detailed description is omitted.

Hereinafter, an apparatus for limiting rotation of a steering wheel according to an embodiment of the present invention will be described with reference to FIGS. 1 and 2.

Figure 2:
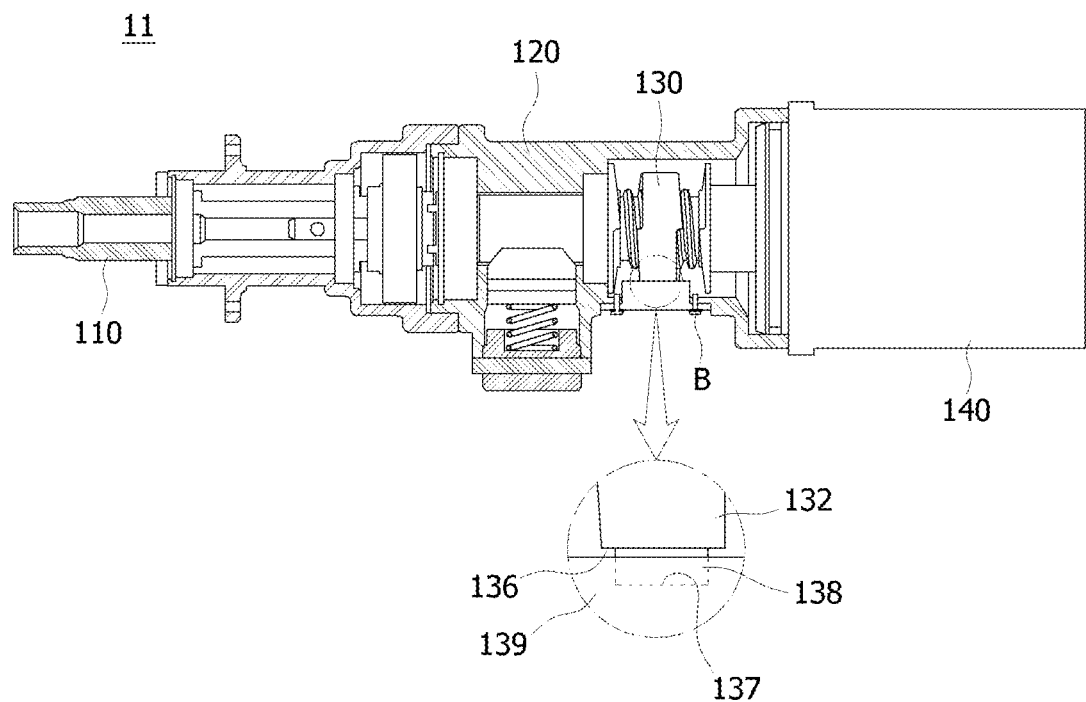
FIG. 2 is a schematic cross-sectional view of a steering reaction force device illustrated in FIG. 1.
Figure 3:
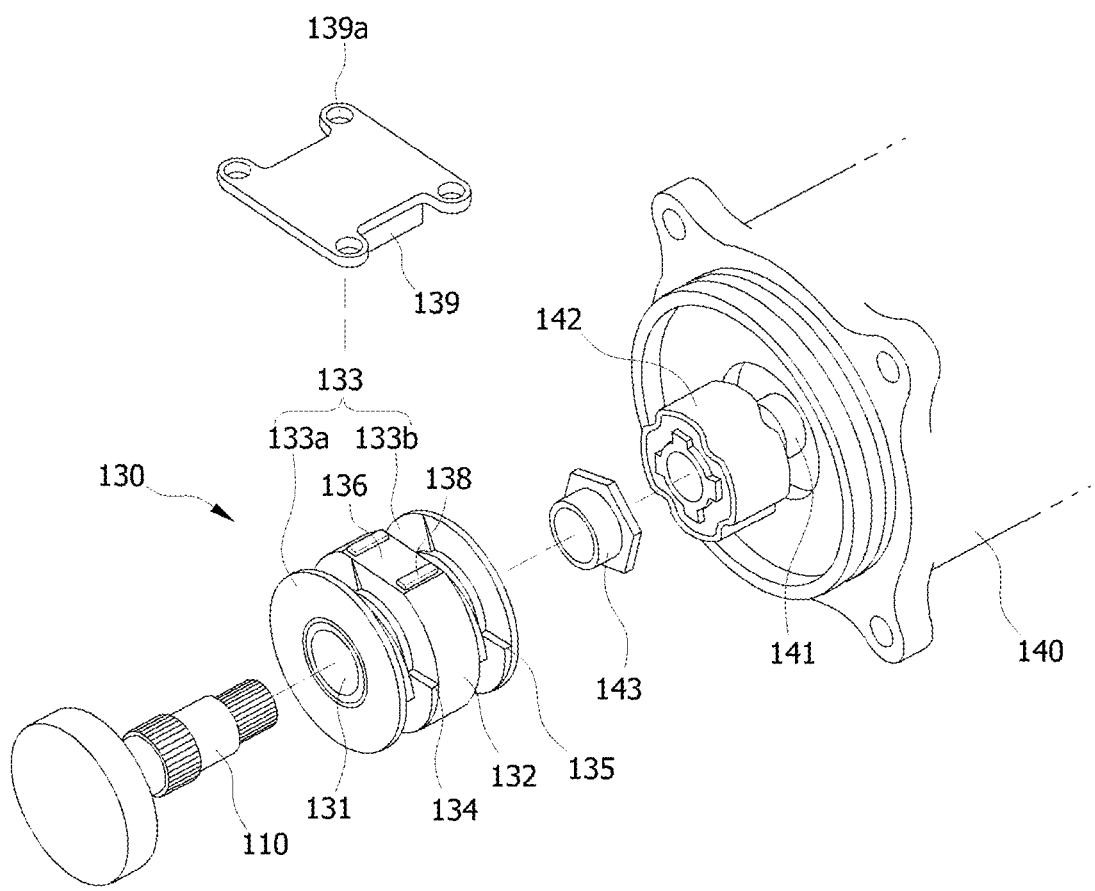
FIG. 3 is an exploded perspective view of an end-stopper illustrated in FIG. 2.

FIG. 1 is a schematic view of a steer-by-wire (SBW) system 10, FIG. 2 is a schematic cross-sectional view of a steering reaction force device 11 illustrated in FIG. 1, and FIG. 3 is an exploded perspective view of an end-stopper 130 illustrated in FIG. 2.

Referring to FIGS. 1 and 2, an SBW system 10 includes a steering reaction force device 11 and a front wheel steering device 12, as described above. The steering reaction force device 11 includes a steering angle sensor, a torque sensor, a steering shaft 110 having a steering wheel installed therein, an apparatus for limiting rotation of a steering wheel, a reaction force motor 140, and an electronic control unit.

The steering angle sensor senses a rotation angle of the steering wheel and transmits an electrical signal proportional to the sensed value to the electronic control unit. The torque sensor senses a magnitude of a steering torque generated in the steering shaft 110 and then transmits an electrical signal to the electronic control unit.

In addition to the steering angle sensor or the torque sensor, a lateral acceleration sensor, a vehicle speed sensor, a yaw rate sensor, or the like may sense a driving situation of a vehicle and transmit an electrical signal to the electronic control unit.

The reaction force motor 140 receives the electrical signal from the electronic control unit and provides a reaction force to the rotation of the steering shaft 110, thereby enabling a driver to feel a steering feeling close to an actual steering feeling.

The apparatus for limiting rotation of the steering wheel includes an end-stopper 130. The end-stopper 130 is disposed inside a housing 120 through which the steering shaft 110 passes, and restricts the rotation angle of the steering wheel to a certain angle.

The housing 120 is formed with a space in which a nut 132, which will be described later, is moved.

Referring to FIG. 3, the end-stopper 130 includes a lead screw 131, a stopper 133, and a nut 132.

The lead screw 131 is coupled to an end of the steering shaft 110. The stopper 133 includes a pair of stoppers and is installed at both ends of the lead screw 131.

The nut 132 passes through the lead screw 131 and is disposed between the stoppers 133.

More specifically, the nut 132 is rotatably assembled to the lead screw 131, and the pair of the stoppers 133 are press-fitted into both ends of the lead screw 131, respectively.

Therefore, when the steering wheel rotates, the lead screw 131 and the stoppers 133 rotate integrally.

The inner diameter of the lead screw 131 is serrated, and the lead screw 131 is slidably assembled to the steering shaft 110 by serration.

After the assembly of the steering shaft 110 and the lead screw 131, a lock nut 143 is fastened to an end of the steering shaft 110, to which the lead screw 131 is assembled, in order to restrain an axial movement of the lead screw 131.

The end of the steering shaft 110 to which the lock nut 143 is fastened, is fastened to a damping coupler 142 provided on a motor shaft 141 of the reaction force motor 140.

The nut 132 is disposed at a midpoint of the lead screw 131 based on a state where the steering wheel has a rotation angle of 0 degrees.

The nut 132 is moved to one side or the other side of the lead screw 131 along the lead screw 131 by the rotation of the steering wheel so as to be closely attached to or separated from the stopper 133.

When rotation of the nut 132 is not constrained when the steering wheel rotates, the nut 132 may be rotated in the same place as the steering shaft 110. Thus, preferably, the rotation of the nut 132 is restrained using an additional fixing member.

Accordingly, the end-stopper 130 further includes a stopping guide 139 for restricting the rotation of the nut 132.

The stopping guide 139 is bolted to a side surface of the housing 120 in parallel with the lead screw 131 (see B in FIG. 2). For this purpose, a plurality of bolt fastening holes 139a are formed in the stopping guide 139.

The nut 132 includes a chamfered portion 136, a mounting portion 137 (shown in FIG. 2), and an elastic member 138.

One side of an outer circumferential surface of the nut 132 is formed in a flat surface so as to face the stopping guide 139, and the chamfered portion 136 is in surface contact with the stopping guide 139.

That is, the rotation of the nut 132 is restrained by surface contact between the stopping guide 139 and the chamfered portion 136. When the steering wheel rotates, a rotational motion of the lead screw 131 is converted into a translational motion of the nut 132.

The mounting portion 137 is recessed into the chamfered portion 136, and the elastic member 138 is inserted into the mounting portion 137.

The elastic member 138 protrudes from the chamfered portion 136 at a predetermined interval to reduce the friction between the stopping guide 139 and the nut 132 when the nut 132 is translated.

The stopper 133 is formed with a stopper stopping jaw 135 projecting toward the nut 132. The nut 132 has a nut stopping jaw 134 protruding toward the stopper 133 on both sides thereof.

That is, by the rotation of the steering wheel, the lead screw 131 and the stopper 133 are simultaneously rotated, and the nut 132 is translated and moved to one side or the other side of the lead screw 131.

After the nut 132 is moved, the stopper stopping jaw 135 and the nut stopping jaw 134 come into contact with each other, thereby limiting the rotation of the steering wheel.

In order to reduce minute rattle noise that may occur when the nut 132 and the stopper 133 come into close contact with each other and more specifically when the stopper stopping jaw 135 and the nut stopping jaw 134 come into contact with each other, preferably, elastic members are provided on at least one of the stopper stopping jaw 135 and the nut stopping jaw 134.

Hereinafter, the operating state of the end-stopper 130 shown in FIG. 2 will be described with reference to FIGS. 4A through 4C.

FIGS. 4A through 4C are diagrams showing an operation state of the end-stopper 130 according to the rotation of the steering shaft 110 shown in FIG. 2.

As illustrated in FIG. 4B, the nut 132 is disposed at a midpoint of the lead screw 131 based on a state in which the steering wheel has a rotation angle of 0 degrees.

Referring to FIG. 4A, when the steering wheel rotates clockwise on the basis of a state in which the steering wheel has a rotation angle of 0 degrees, the nut 132 moves along the lead screw 131, is translated in a direction toward one side of the lead screw 131, and is in tight contact with the stopper 133.

When the nut 132 and the stopper 133 are in close contact with each other, the nut stopping jaw 134 and the stopper stopping jaw 135 make contact with each other.

Thus, the nut stopping jaw 134 and the stopper stopping jaw 135 make contact with each other, and the translational motion of the nut 132 is stopped so that the rotation of the steering wheel is stopped and thus a clockwise rotation angle of the steering wheel is limited.

Referring to FIG. 4C, when the steering wheel rotates counterclockwise on the basis of a state in which the steering wheel has a rotation angle of 0 degrees, the nut 132 moves along the lead screw 131 to make a translational motion in a direction toward the other side of the lead screw 131 and is brought into close contact with the stopper 133.

When the nut 132 and the stopper 133 are in close contact with each other, the nut stopping jaw 134 and the stopper stopping jaw 135 make contact with each other.

Accordingly, the nut stopping jaw 134 and the stopper stopping jaw 135 are brought into contact with each other and the translation of the nut 132 is stopped, so that the rotation of the steering wheel is stopped and thus the counterclockwise rotation angle of the steering wheel is limited.

Here, when the steering wheel rotates clockwise and the nut 132 moves in the other direction, the nut 132 is moved in one direction when the steering wheel rotates counterclockwise.

As described above, in the apparatus for limiting rotation of the steering wheel according to an embodiment of the present invention, the rotation angle of the steering wheel can be restricted to a predetermined angle through the structure of the end-stopper 130.

The nut 132 is disposed at a midpoint of the lead screw 131 on the basis of a state in which the steering wheel has a rotation angle of 0 degrees, and when the steering wheel is rotated clockwise within a predetermined angle in the state in which the steering wheel has the rotation angle of 0 degrees, the nut 132 comes into close contact with the stopper 133 on one side, and when the steering wheel is rotated counterclockwise within a predetermined angle in the state in which the steering wheel has the rotation angle of 0 degrees, the nut 132 comes into close contact with the stopper 133 on the other side. In detail, the predetermined angle may be set to 120 degrees, 180 degrees, 240 degrees, and the like.

In other words, according to the present invention, it is possible to drive the entire range of the front wheel within the 360 degree rotation range of the steering wheel through adjustment of a screw ratio. The specific screw ratio can be changed according to the speed of the vehicle.

Figure 5:
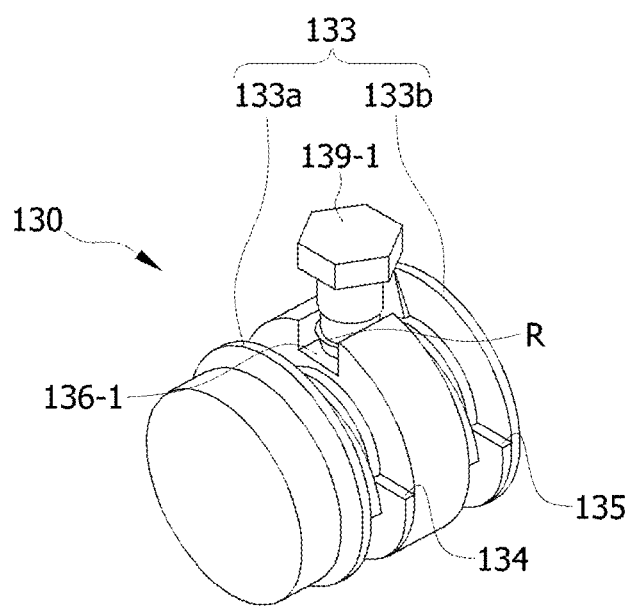
FIG. 5 is a perspective view of an end-stopper according to another embodiment of the present invention.
Figure 6:
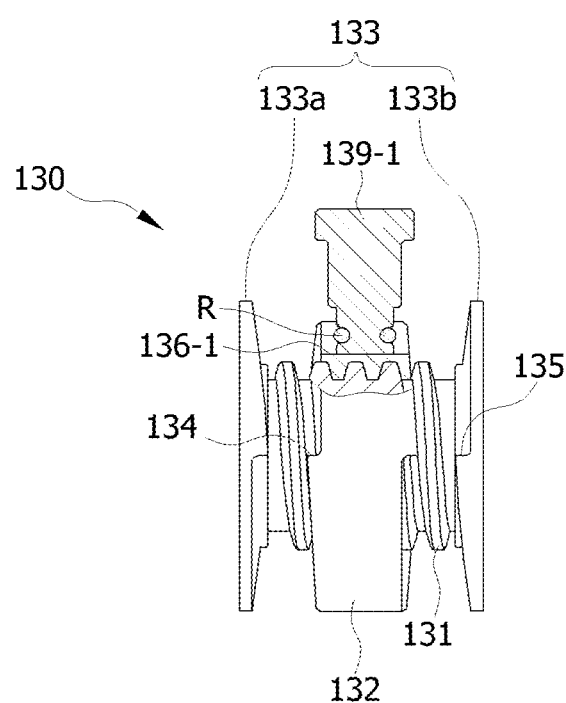
FIG. 6 is a partial cross-sectional view taken along a line A-A' of the end-stopper illustrated in FIG. 5.

FIG. 5 is a perspective view of an end-stopper 130 according to another embodiment of the present invention, and FIG. 6 is a partial cross-sectional view taken along a line A-A' of the end-stopper 130 shown in FIG. 5.

Figure 4:
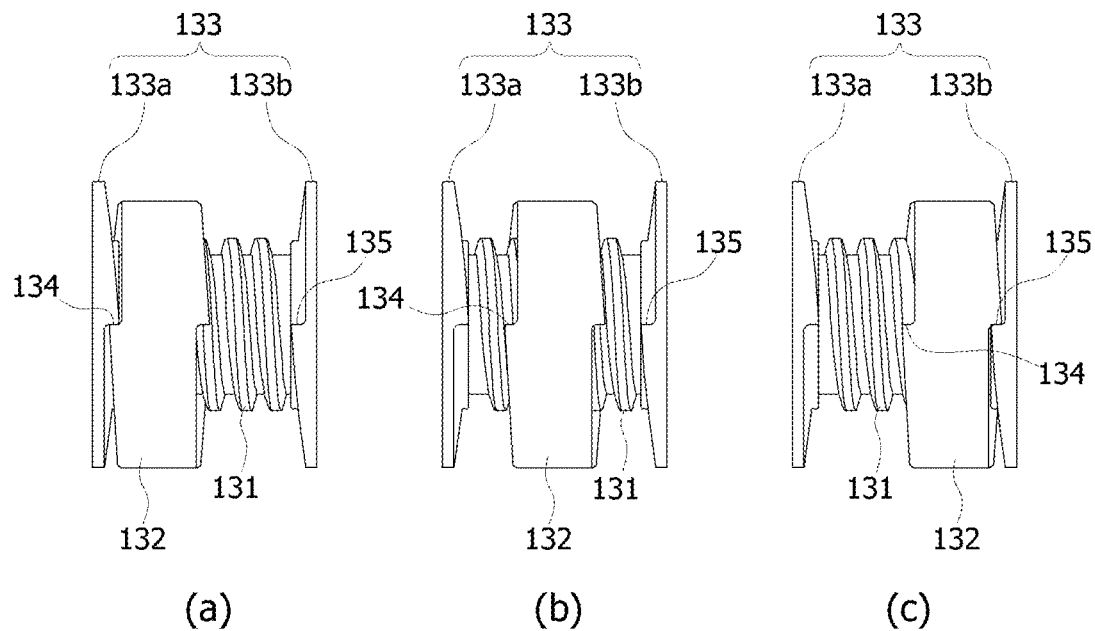
FIGS. 4A through 4C are views illustrating an operating state of the end-stopper according to rotation of a steering shaft illustrated in FIG. 1.

The embodiment of the end-stopper 130 shown in FIGS. 5 and 6 is different from the embodiment shown in FIGS. 2 to 4 in that the nut 132 includes a guide groove 136-1 formed on one side of an outer circumferential surface of the nut 132 and a rotation preventing member 139-1 at least a portion of which is inserted into the guide groove 136-1 and which restricts rotation of the nut 132.

That is, the nut 132 includes the guide groove 136-1 instead of the chamfered portion 136, and the rotation preventing member 139-1 replaces the stopping guide 139.

As ascertained from FIGS. 5 and 6, the rotation preventing member 139-1 may include a guide pin having one side fixed to the housing 120 and the other side inserted into the guide groove 136-1. Also, the guide groove 136-1 formed in the nut 132 may have a U-shape along a direction toward the steering shaft 110 on one side of the outer circumferential surface of the nut 132.

According to this embodiment, since the rotation preventing member 139-1 formed of the guide pin limits the rotation of the nut 132 in a state in which the rotation preventing member 139-1 is inserted into the guide groove 136-1 formed on the outer circumferential surface of the nut 132, the rotation of the nut 132 can be restrained more stably.

At this time, the rotation preventing member 139-1 moves along the direction toward the steering shaft 110 on the guide groove 136-1 in accordance with the rotation of the nut 132. Therefore, preferably, the rotation preventing member 139-1 includes an O-ring R on an outer circumferential surface that is in contact with the guide groove 136-1 so as to prevent abrasion and to reduce noise. That is, preferably, an O-ring insertion groove is formed at the other side of the rotation preventing member 139-1 inserted into the guide groove 136-1, and the O-ring R is coupled to the O-ring insertion groove.

As described above, in an apparatus for limiting rotation of a steering wheel according to the present invention, a rotation angle of the steering wheel can be limited to a predetermined angle using the structure of an end-stopper.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for limiting rotation of a steering wheel, which is installed in a steering system, comprising:
   an end-stopper disposed inside a housing through which a steering shaft on which the steering wheel is installed, passes, and the end-stopper limiting a rotation angle of the steering wheel to a predetermined angle; and
   a stopping guide configured to restrain rotation of the nut,
   wherein the end-stopper comprises: a lead screw coupled to an end of the steering shaft, a pair of stoppers installed on both ends of the lead screw, and a nut passed through by the lead screw and disposed between the pair of stoppers, and
   wherein the nut comprises: a chamfered portion being in surface contact with the stopping guide, a mounting portion recessed in the chamfered portion, and an elastic member inserted into the mounting portion.

2. The apparatus of claim 1, wherein the elastic member protrudes from the chamfered portion at a predetermined interval.

3. The apparatus of claim 1, wherein the stopper comprises a stopper stopping jaw projecting toward the nut.

4. The apparatus of claim 3, wherein the nut comprises a nut stopping jaw protruding toward the stopper on both sides thereof.

5. The apparatus of claim 4, wherein, when the stopper stopping jaw and the nut stopping jaw are in contact with each other, rotation of the steering wheel is limited.

6. The apparatus of claim 1, wherein the nut is disposed at a midpoint of the lead screw on the basis of a state in which the steering wheel has a rotation angle of 0 degrees, and when the steering wheel is rotated clockwise within a predetermined angle in the state in which the steering wheel has the rotation angle of 0 degrees, the nut comes into close contact with the stopper on one side, and when the steering wheel is rotated counterclockwise within a predetermined angle in the state in which the steering wheel has the rotation angle of 0 degrees, the nut comes into close contact with the stopper on the other side.

7. The apparatus of claim 1, wherein the nut comprises a guide groove formed on one side of an outer circumferential surface of the nut and further comprises a rotation preventing member at least a portion of which is inserted into the guide groove and which restrains rotation of the nut.

8. The apparatus of claim 7, wherein the rotation preventing member comprises a guide pin having one side fixed to the housing and the other side inserted into the guide groove.

9. The apparatus of claim 8, wherein the guide groove has a U-shape along a direction toward the steering shaft on one side of the outer circumferential surface of the nut.

10. An apparatus for limiting rotation of a steering wheel, which is installed in a steering system, comprising:
    an end-stopper disposed inside a housing through which a steering shaft on which the steering wheel is installed, passes, and the end-stopper limiting a rotation angle of the steering wheel to a predetermined angle,
    wherein the end-stopper comprises: a lead screw coupled to an end of the steering shaft, a pair of stoppers installed on both ends of the lead screw, and a nut passed through by the lead screw and disposed between the pair of stoppers, and
    wherein the nut comprises a guide groove formed on one side of an outer circumferential surface of the nut and further comprises a rotation preventing member at least a portion of which is inserted into the guide groove and which restrains rotation of the nut.

11. The apparatus of claim 10, further comprising a stopping guide configured to restrain rotation of the nut.

12. The apparatus of claim 11, wherein the nut comprises:
    a chamfered portion being in surface contact with the stopping guide;
    a mounting portion recessed in the chamfered portion; and
    an elastic member inserted into the mounting portion.

13. The apparatus of claim 12, wherein the elastic member protrudes from the chamfered portion at a predetermined interval.

14. The apparatus of claim 10, wherein the stopper comprises a stopper stopping jaw projecting toward the nut.

15. The apparatus of claim 14, wherein the nut comprises a nut stopping jaw protruding toward the stopper on both sides thereof.

16. The apparatus of claim 15, wherein, when the stopper stopping jaw and the nut stopping jaw are in contact with each other, rotation of the steering wheel is limited.

17. The apparatus of claim 10, wherein the nut is disposed at a midpoint of the lead screw on the basis of a state in which the steering wheel has a rotation angle of 0 degrees, and when the steering wheel is rotated clockwise within a predetermined angle in the state in which the steering wheel has the rotation angle of 0 degrees, the nut comes into close contact with the stopper on one side, and when the steering wheel is rotated counterclockwise within a predetermined angle in the state in which the steering wheel has the rotation angle of 0 degrees, the nut comes into close contact with the stopper on the other side.

18. The apparatus of claim 10, wherein the rotation preventing member comprises a guide pin having one side fixed to the housing and the other side inserted into the guide groove.

19. The apparatus of claim 18, wherein the guide groove has a U-shape along a direction toward the steering shaft on one side of the outer circumferential surface of the nut.

* * * * *